(12) United States Patent
Ikeda

(10) Patent No.: US 6,523,652 B2
(45) Date of Patent: Feb. 25, 2003

(54) DRUM BRAKE DEVICE

(75) Inventor: Takashi Ikeda, Owariasahi (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/792,076

(22) Filed: Feb. 26, 2001

(65) Prior Publication Data

US 2002/0117364 A1 Aug. 29, 2002

(30) Foreign Application Priority Data

Feb. 25, 2000 (JP) ......................................... 2000-049857

(51) Int. Cl.⁷ .............................................. F16D 51/00
(52) U.S. Cl. ..................................... 188/341; 188/331
(58) Field of Search ............................... 188/341, 334, 188/327, 326, 331

(56) References Cited

U.S. PATENT DOCUMENTS

| | | | | | |
|---|---|---|---|---|---|
| 2,161,641 A | * | 6/1939 | Schnell | .................. | 188/334 |
| 2,232,308 A | * | 2/1941 | Berglund | .................. | 188/334 |
| 2,251,854 A | * | 8/1941 | Parnell et al. | .............. | 188/340 |
| 2,280,784 A | * | 4/1942 | Berno | .................. | 188/333 |
| 2,347,239 A | * | 4/1944 | Berno | .................. | 188/325 |
| 2,396,387 A | * | 3/1946 | Rasmussen | .................. | 188/341 |
| 2,503,489 A | * | 4/1950 | James | .................... | 188/106 A |
| 4,768,631 A | * | 9/1988 | Heibel | ........................ | 188/334 |
| 4,787,487 A | * | 11/1988 | Conradi | .................. | 188/112 R |
| 5,070,968 A | * | 12/1991 | Evans | .................... | 188/106 A |
| 5,819,887 A | * | 10/1998 | Asai et al. | .................. | 188/340 |
| 5,924,529 A | * | 7/1999 | Ikeda et al. | ................. | 188/331 |
| 6,095,296 A | * | 8/2000 | Ikeda | .......................... | 188/340 |

* cited by examiner

*Primary Examiner*—Jack Lavinder
*Assistant Examiner*—Robert A. Siconolfi
(74) *Attorney, Agent, or Firm*—Liniak, Berenato & White

(57) ABSTRACT

This invention provides a duo-two leading type drum brake device which simplifies a drum brake structure as well as improves a transmission efficiency of a application force from a shoe actuator to brake shoes. A pivot lever 60 has an intermediate portion pivotally supported on the brake shoes 40. A shoe-actuator 20 is positioned adjacent to the first anchors 30, 30 and being disposed between the ends 60*a*, 50*a* of the pivot lever 60 and the other brake shoe 50. A strut 70 is positioned between and functionally engaged with the other ends 60*b*, 50*b* of the pivot lever 60 and the other brake shoe 50. An application force of the shoe actuator 20 is transmitted to the brake shoe 40 via a pivot section of the pivot lever 70 and transmitted to the other brake shoe 50 directly from the shoe-actuator 20 and indirectly via the strut 70.

7 Claims, 10 Drawing Sheets

DRUM BRAKE DEVICE

FIELD OF THE INVENTION

This invention relates to a drum brake device with a single service brake shoe-actuator, intended in particular to provide a braking force equivalent to that of duo-two leading (hereinafter "D2L") type drum brake with two service brake shoe-actuators.

DESCRIPTION OF THE PRIOR ART

A drum brake device with a single shoe-actuator capable of providing a braking force equivalent to that of a D2L type drum brake device is disclosed by this applicant in the Japanese Patent Laid-Open Provisional Publication No. 10-47396.

This conventional drum brake device is briefly explained with reference to FIG. 10. In this drum brake device, first anchors 29, 29 are positioned between adjacent ends 40a, 50a of a pair of brake shoes 40, 50, and second anchors 11, 11 incorporating shoe clearance adjustment devices are provided between the other ends 40b, 50b of the brake shoes 40, 50. Further, pivot levers 60, 60 are pivotally mounted on intermediate portions of the brake shoes 40, 50; adjacent ends 60a, 60a of the pivot levers 60, 60 operationally engage with pistons 23, 23 housed in a wheel cylinder 20, i.e., the shoe-actuator, operated by during the service brake actuation; and the other adjacent ends 60b, 60b of the pivot levers 60, 60 engage with the second anchors 11, 11.

Regarding the operation of the service brake in the conventional drum brake, when a brake pedal is pressurized the wheel cylinder 20; the pistons 23, 23 press the adjacent ends 60a, 60a of the pivot levers 60, 60; the pivot levers 60, 60 pivot and move with a point of abutment between the other adjacent ends 60b, 60b and the second anchors 11, 11. An outward force applied to the pivot levers 60, 60 is transmitted to the brake shoes 40, 50 via pivot sections 61, 61, and urge the linings 43, 53 to frictionally engage with a brake drum, not shown in the figure.

When the brake drum is rotating in the direction of arrow A, the brake shoes 40, 50 move along the rotational direction A of the brake drum; the shoe end 40b and shoe end 50a are supported by the anchors 11, 29 respectively, thereby generating a braking force.

When the brake drum is rotating in the direction of arrow B, the brake shoes 40, 50 move along the rotational direction B; the shoe end 50b and shoe end 40a are supported by the anchors 11, 29 respectively, thereby generating a braking force, too.

The above-described conventional drum brake device has the following limitations.

When the wheel cylinder 20, i.e., the shoe-actuator, pivots and moves the pivot levers 60, 60 with the point of abutment at the second anchors 11, 11 supporting the other adjacent ends 60b, 60b, the brake shoes 40, 50 move relative to the pivot section 61, 61, and frictionally engage with the rotating brake drum. Thereafter, the brake shoes 40, 50 generate the braking force by being abutted against and supported by either the first or the second anchor 11, 29. When the brake shoes 40, 50 move together with the brake drum, the other adjacent ends 60b, 60b of both pivot levers 60, 60 slide on the second anchors 11, 11 while supporting the operation force applied by the wheel cylinder 20, i.e., shoe-actuator. Therefore, the conventional drum brake has an unavoidable decrease in braking efficiency due to the resistance at the sliding portions and the rotational resistance at the pivot sections 61, 61.

The sliding resistance at the other adjacent ends 60b, 60b and the rotational resistance at the pivot sections 61, 61 are increased proportional to the operational force of the wheel cylinder 20, i.e., shoe-actuator, which leads to be a lower durability of the device due to wearing and fatigue in these sections.

During braking, a thrust force from the pivot levers 60, 60 acts on the second anchors 11, 11 incorporating the shoe clearance adjustment devices. If the automatic shoe clearance adjustment devices, that keep the constant clearances between the brake drum and linings 43, 43, is utilized as the shoe clearance adjustment ones, the thrust force affects to the automatic adjustment action as a variance factor, which tends to vary the clearances between the brake drum and the linings 43, 53.

SUMMARY AND OBJECT OF THE INVENTION

It is an object of this invention to improve the braking efficiency and the durability of the drum brake device and to attain a stable automatic shoe clearance adjustment action by allowing the pivot section of the pivot lever to swing.

This invention is based on a drum brake device comprising: a pair of brake shoes positioned to face each other and to be frictionally engagable with an inner circumferential surface of a brake drum; a first anchor positioned between first adjacent ends of the brake shoes; a second anchor positioned between second adjacent ends of the brake shoes opposite the first adjacent ends; a pivot lever with an intermediate portion pivotally supported on a first one of the brake shoes; a shoe-actuator positioned adjacent to the first anchor and being disposed between one end of the pivot lever and a second one of brake shoes; and a strut positioned between and functionally engaged with a second end of the pivot lever and the second one of the brake shoes. This invention is characterized in that an application force of the shoe-actuator is transmitted to the first one of the brake shoes via a pivot section of the pivot lever and transmitted to the second one of the brake shoes directly from said shoe-actuator and indirectly via the strut.

When the brake shoes frictionally engage and interact with the brake drum during braking, the pivot lever is supported by the strut free to swing in order to smoothly move together with the brake shoes, thereby providing a D2L type drum brake device with high braking efficiency despite the use of a single shoe-actuator.

The pivot lever smoothly moves until it contacts with one of brake shoes supported by the anchor, which eliminates overload on the pivot and abutment sections thereof and provides a highly durable device.

When incorporating the automatic shoe clearance adjustment mechanism, no overload is encountered when adjusting. Therefore, operation of the delicate automatic shoe clearance adjustment device, which requires micro-adjustment, may be stabilized.

This invention enables the downsizing of the pivot lever and strut for realizing the drum brake with one shoe-actuator for the service brake, which reduces the cost of manufacturing and the overall weight of the device.

The parking brake mechanism of this invention can easily be installed.

BRIEF DESCRIPTION OF THE DRAWINGS

The above and other objects and advantages of the present invention will become readily apparent by reference to the following detailed description when considered in conjunction with the accompanying drawings.

DETAILED DESCRIPTION OF PREFERRED EMBODIMENT

First Embodiment

A first embodiment of this invention is explained with reference to FIGS. 1–6.

Figure 1:
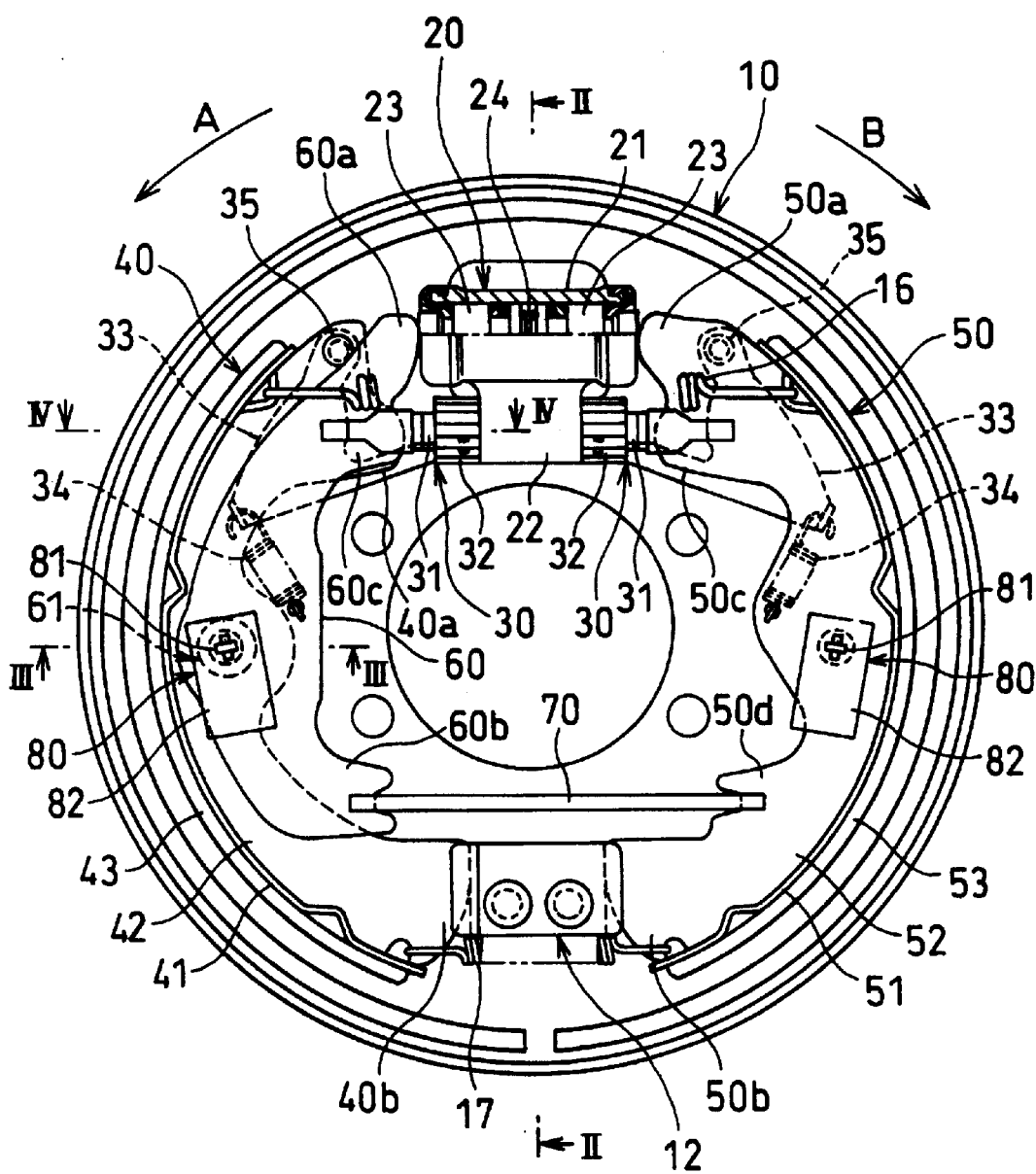
FIG. 1 is a plan view of the first embodiment of this invention.
Figure 2:
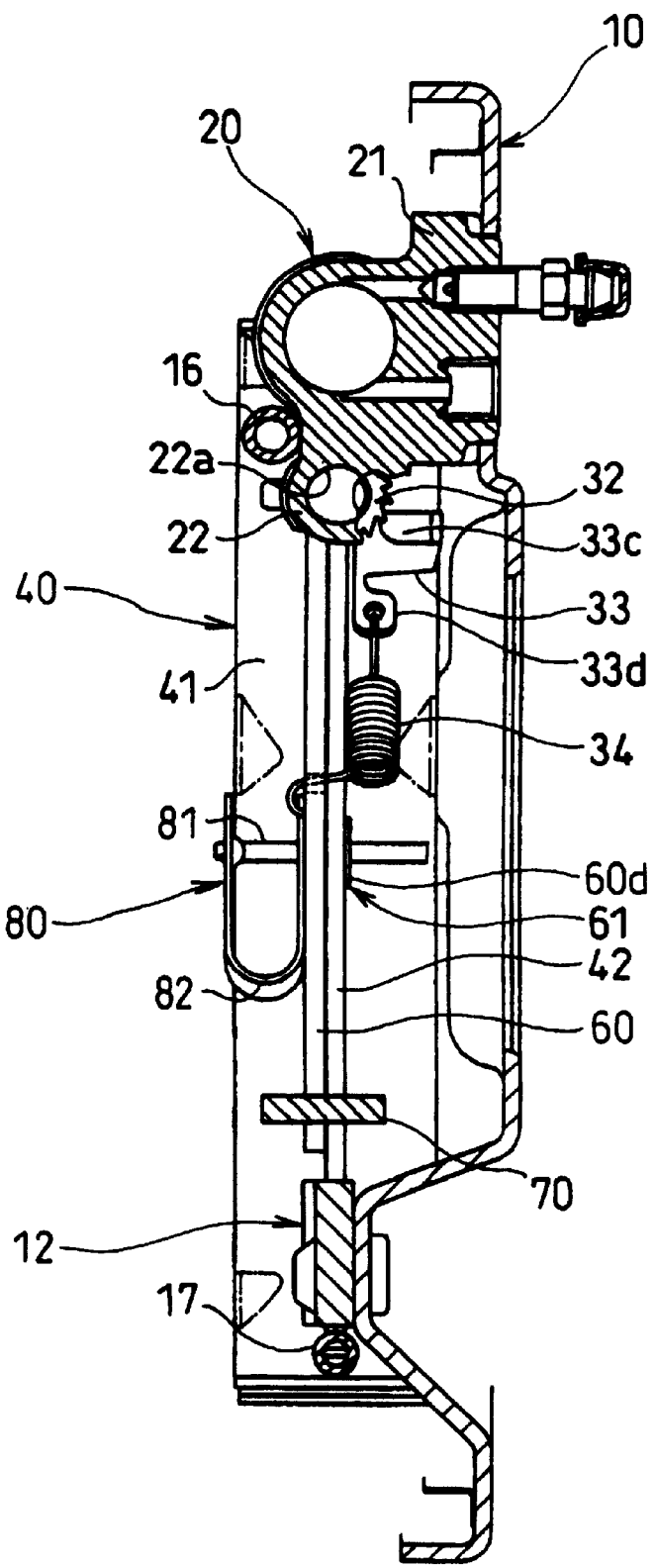
FIG. 2 is a cross-section view of FIG. 1 taken along the line II—II.

FIG. 1 is a plan view of a drum brake device incorporating a pair of brake shoes 40, 50 frictionally engageable with an inner circumferential surface of a brake drum not shown in the figures. A wheel cylinder 20, i.e., a shoe-actuator, operated by the service brake actuation, is positioned on an upper portion of a back plate 10 while a second anchor 12 is positioned on a lower portion of the back plate 10.

First anchors 30, 30 incorporating shoe clearance adjustment devices are positioned adjacent to but closer to a brake center than the wheel cylinder 20, which is combined with an anchor body 22 integrally extended from the cylinder body 21.

This drum brake device further comprises a pivot lever 60 and a strut 70 so as to transmit an operation force of the wheel cylinder 20 to both brake shoes 40, 50.

The pair of brake shoes 40, 50 is configured so that shoe rims 41, 51 are fixed on shoe webs 42, 52 respectively to form a T-shaped cross-section. The linings 43, 53 are affixed on the peripheral surfaces of the shoe rims 41, 51.

As shown in FIG. 1, one brake shoe 40 has one end 40a (hereinafter "upper end 40a") which abuts against and engages with a left adjustment bolt 31 as a screw member of the shoe clearance adjustment devices constituting the first anchor 30, while the other end 40b(hereinafter "lower end 40b") abuts against and engages with a side end surface of the second anchor 12.

The other brake shoe 50 has its one end 50a (hereinafter "upper end 50a") which operationally engages with a piston 23 of the wheel cylinder 20; its other end 50b (hereinafter "lower end 50b") abuts against and engages with a flat side end surface of the second anchor 12; while an upper intermediate portion 50c closer to the upper end 50a abuts against and engages with a right adjustment bolt 31 as a screw member just like the brake shoe 40.

A prime characteristic of this invention is to implement a mechanical expander comprising one pivot lever 60 and a strut 70 as a means to transmit an application force of the wheel cylinder 20 to the pair of the brake shoes 40, 50 as the outward force of the brake shoes 40, 50.

The arc-shaped pivot lever 60 is superposed on the shoe web 42, in which an intermediate portion of the pivot lever 60 is pivotally supported at an intermediate portion of the shoe web 42 and one end 60a (hereinafter "upper end 60a") operationally engages with the left piston 23 of the wheel cylinder 20. The strut 70 is positioned between the other end 60b (hereinafter "lower end 60b") and an intermediate portion 50d closer to the lower end 50b of the brake shoe 50, wherein notched grooves formed thereon with respect to all three of the aforementioned elements cross to functionally engage each other. The engagement is maintained by a compression spring 24 disposed between the pistons 23 and 23. An intermediate portion 60c closer to the upper portion of the pivot lever 60 engages with the adjustment bolt 31 of the first anchor 30 incorporating the shoe clearance adjustment device with a clearance between a front edge of the pivot lever 60 and the bottom of a notched groove on the adjustment bolt 31.

Figure 3:
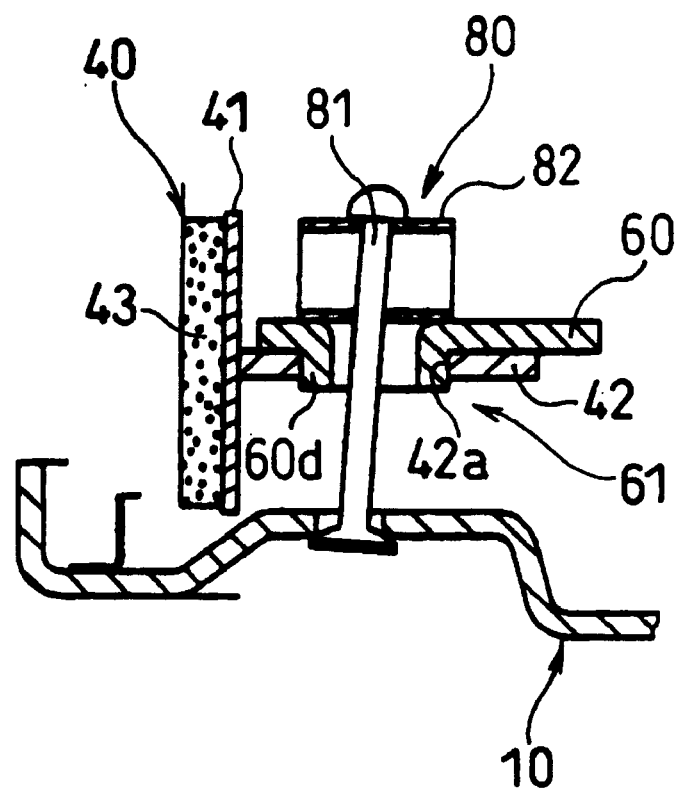
FIG. 3 is a cross-section view of FIG. 1 taken along the line III—III.

FIG. 3 is a cross-sectional view of the pivot section 61 between the brake shoe 40 and the pivot lever 60, wherein a cylindrical protuberance 60d projecting toward the shoe web 42 is formed on the intermediate portion of the pivot lever 60, and the protuberance 60d is pivotally fit inside a circular hole 42a pierced on the shoe web 42.

Although not shown in the figures, a circular hole may be pierced on the pivot lever 60 and a protuberance may be formed on the shoe web 42 to constitute the pivot structure. Alternatively, an independent separate pin may be utilized to constitute the same effect as a protuberance.

The pivot section 61 between the brake shoe 40 and the pivot lever 60 is held by a shoe hold pin 81, being rotatably provided on the back plate 10 and intermediate portion of which is freely penetrating through the protuberance 60d, and a plate spring 82, latched at the other side of the pin 81 and compressed to be installed on the pivot lever 60. A publicly known shoe hold mechanism 80 is utilized to resiliently hold the brake shoe 40 on the back plate 10 and the pivot lever 60 on the shoe web 42.

The shoe hold pin 81 may be implemented similar to a bolt where one end thereof is fixed in the back plate 10 and the other end portion thereof is held with upper and lower nuts so as to movably hold the brake shoe 40 and the pivot lever 60 therebetween.

In this configuration the brake shoe 50 is resiliently held on the back plate 10 with the publicly known shoe hold mechanism 80.

Figure 4:
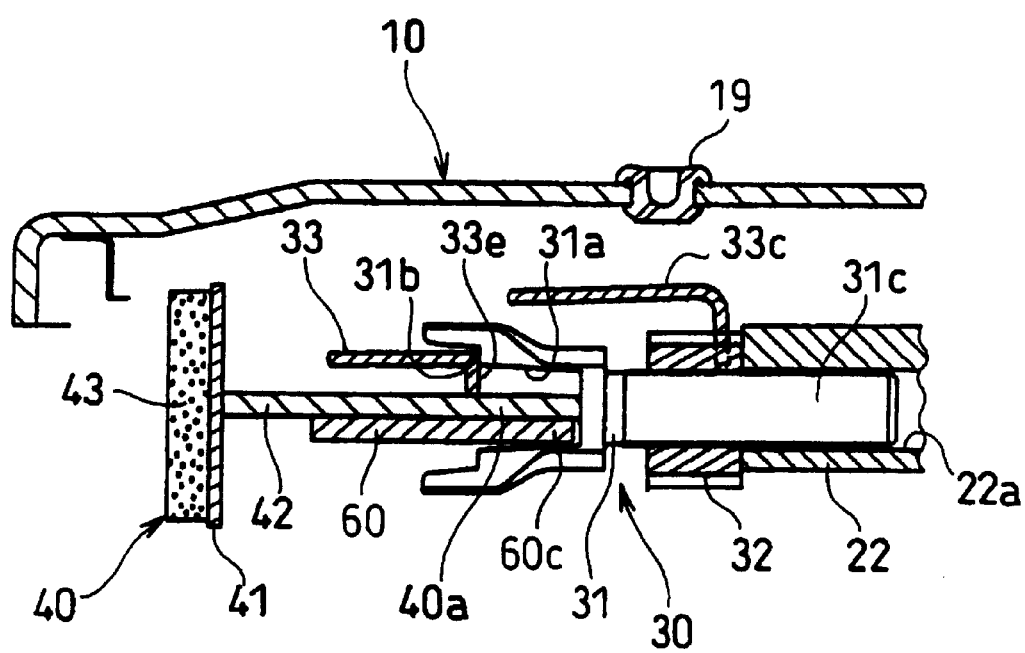
FIG. 4 is a cross-section view of FIG. 1 taken along the line IV—IV.

FIG. 4 is an enlarged view of the left half of the first anchors 30, 30 incorporating the shoe clearance adjustment devices. The structure's right half thereof is symmetrical relative to the left half except that the adjustment bolt 31 and a toothed ring 32 are reverse threaded; therefore, the explanation of which is omitted hereunder.

A through bore 22a is formed in the anchor body 22, into which an externally threaded shaft 31c of the adjustment bolt 31 is slidably fit.

A stepped shape notched groove 31a is formed at left side of the adjustment bolt 31, and the upper end 40a of the shoe web 42 abuts against the bottom of the notched groove 31a and the intermediate portion 60c closer to the upper end 60a of the pivot lever 60 engages with the bottom of the notched groove 31a with a clearance.

The toothed ring 32 screwed on the external threaded shaft 31c of the adjustment bolt 31 has plural small teeth on its circumferential surface, and its right side surface abuts against the left side surface of the anchor body 22 so as to restrict the retract position of the adjustment bolt 31 relative to the anchor body 22 and is capable to vary the displacement of the adjustment bolt 31 relative to the anchor body 22 by rotating the toothed ring 32.

The first anchor 30 incorporated with the shoe clearance adjustment device comprises the anchor body 22, the adjustment bolt 31 inserted is inserted, and the toothed ring 32 screwed on the adjustment bolt 31.

When adjusting the clearance between the lining 43 and the brake drum, not shown in the figures, a plug 19 installed on the back plate 10 is to be removed, and then a tool such as a screw driver is inserted from the outside of the brake to rotate the toothed ring 32 in order to screw the adjustment bolt 31 in or out of the toothed ring 32, thereby enabling the manual adjustment of the clearance.

Configuring an adjustment lever 33 and an adjustment spring 34 in the shoe clearance adjustment device constitutes an automatic shoe clearance adjustment device that automatically adjusts the clearance between the lining 43 and the brake drum.

Figure 5:
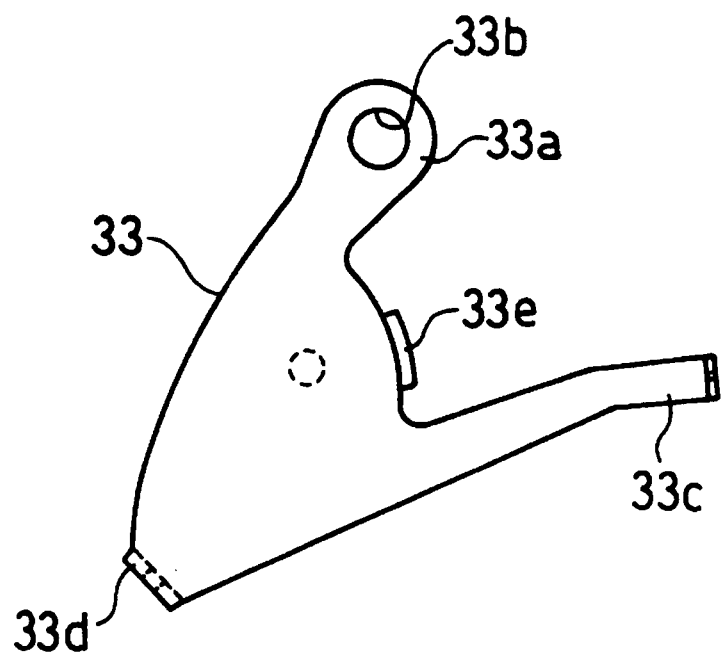
FIG. 5 is a plan view of the adjustment lever.

FIG. 5 shows a plan view of the adjustment lever 33. The adjustment lever 33 is an almost Y-shaped flat plate, a first arm 33a has a pin hole 33b while a second arm 33c has a bent end making a ratchet engagement with the toothed ring 32. At the opposite side of the arms is provided a third arm 33d which also has a bent end having a hole or slit to catch one hook of the adjustment spring 34. An abutment piece 33e is formed by bending at the intersection of the first and the second arms 33a, 33c, against which a stepped surface 31b on the notched groove 31a of the adjustment bolt 31 abuts.

The adjustment lever 33 is pivotally supported with the pin hole 33b on the brake shoe 40 by a pin 35 as shown in FIG. 1.

The adjustment spring 34 extended between the third arm 33d and the pivot lever 60 constantly applies the adjustment lever 33 with a counterclockwise turning force around the pin 35 and the second arm 33c bias force toward the toothed ring 32, whereby urging the abutment piece 33e to abut and engage the stepped surface 31b of the adjustment bolt 31 as shown in FIG. 4.

An outline of the right adjustment lever 33 is symmetrical relative to the left one, and the adjustment spring 34 is extended between the adjustment lever 33 and the shoe web 52 so as to apply the adjustment lever 33 with a clockwise turning force around the pin 35 and the second arm 33c bias force toward the toothed ring 32 into the ratchet engagement.

As shown in FIG. 1, a first shoe return spring 16 is extended between the brake shoes 40 and 50 in close vicinity to the wheel cylinder 20 while a second shoe return spring 17 is extended between the brake shoes 40 and 50 in close vicinity to the second anchor 12. A spring force of the first and the second shoe return springs 16, 17 is specified such that a moment around the pivot point 61 of the brake shoe 40 acting as a fulcrum due to the first and the second shoe return springs 16, 17 acting on the brake shoe 40 is adjusted to set the lower side 40b larger than the upper side 40a.

Operation of the drum brake when the service brake in effect is explained with reference to an explanatory drawing in FIG. 6.

When a brake pedal is activated, the pistons 23, 23 of the wheel cylinder 20 depress the pivot lever 60 and the brake shoe 50 outward respectively, which leads to move the pair of brake shoes 40, 50 under the following operation.

If the pistons 23, 23 press the pivot lever 60 and the brake shoe 50 outward respectively, the pivot lever 60 is urged to rotate counterclockwise with the pivot point at the pivot section 61, and the operational force of the wheel cylinder 20 is transmitted to the brake shoe 50 via the strut 70.

Afterward the brake shoe 50 spreads open with the point of abutment with the second anchor 12 as the fulcrum due to the application forces of the piston 23, 23 transmitted from the upper ends 50a and the intermediate portion 50d closer to the lower end 50b.

At the same time, the pivot lever 60 moves counterclockwise with the point of abutment with the strut 70 by the operational force of the wheel cylinder 20; the force transmitted via the pivot section 61 causes the brake shoe 40 to spread open at the abutment point with the second anchor 12.

Figure 6:
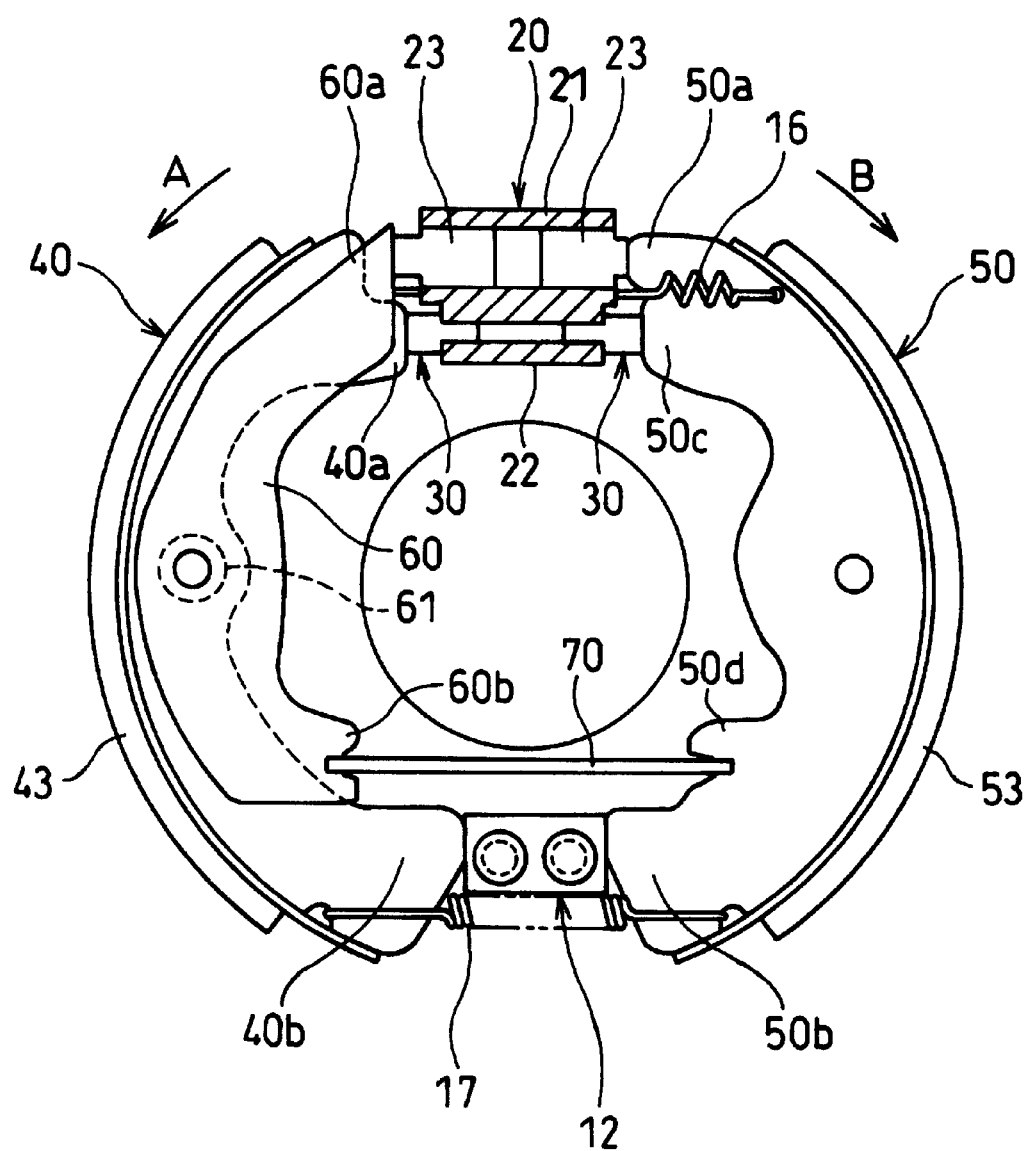
FIG. 6 is an explanatory drawing of the drum brake device in FIG. 1 explaining the operation when service brake is in activated.

In FIG. 6, if the brake drum, not shown in the figures, rotates counterclockwise in the direction A, the lower end 40b of the brake shoe 40 is supported by the second anchor 12, thereby functioning as a leading shoe with self-servo effect, while the intermediate portion 50c close to the upper end 50a of the brake shoe 50 is supported by the first anchor 30, thereby functioning as a leading shoe with self-servo effect. Therefore, the pair of brake shoes 40, 50 provide two-leading braking action.

If the brake drum rotates clockwise in the direction B, the lower end 50b of the brake shoe 50 is supported by the second anchor 12, thereby functioning as a leading shoe with self-servo effect, while the upper end 40a of the brake shoe 40 is supported by the first anchor 30, thereby functioning as a leading shoe with self-servo effect. Therefore, the pair of brake shoes 40, 50 provide two-leading braking action.

Although the drum brake comprises only one wheel cylinder 20 as a shoe-actuator, both brake shoes 40, 50 have self-servo effect when the vehicle is moving forward or backward, thereby functioning as leading shoes with self-servo effect being derived from a D2L type drum brake device, which offers a stable braking effect.

When the brake shoe 40 and the pivot lever 60 move interactive to the rotating brake drum, the strut 70 is able to swing thereby allowing smooth movement of the two, i.e., the brake shoe 40 and the pivot lever 60, which avoids decreasing the braking efficiencies and increases the device durability.

The brake shoes 40, 50, while in the service brake operation, spread open with the point of abutment between the lower adjacent ends 40b, 50b and the second anchor 12, thereby frictionally engaging with the brake drum, not shown in the figures.

As is evident from FIG. 1, the only difference in the adjustment levers 33, 33 is that the rotational direction of the right adjustment lever 33 with the pin 35 acting as the fulcrum is different from that of the left adjustment lever 33. Therefore, this section explains the left half of the shoe clearance adjustment and the explanation concerning the right half is omitted hereunder.

If the brake shoe 40 spreads open, the pin 35 moves together. The abutment piece 33e of the adjustment lever 33 is forced against the stepped surface 31b of the adjustment bolt 31 by a urging force of the adjustment spring 34, thereby the second arm 33c rotating counterclockwise.

When the lining 43 is worn off, the total displacement of the brake shoe 40 increases, which leads to increase the amount of rotation of the bent end at the second arm 33c of the adjustment lever 33. If the amount of rotation of the adjustment lever 33 exceeds one tooth pitch of the toothed ring 32, the second arm 33c rotates the toothed ring 32 so as to protrude the adjustment bolt 31 from the anchor body 22, thereby automatically adjusting to keep a constant clearance between the lining 43 and the brake drum.

As is evident from the above-description, during the automatic shoe clearance adjustment operation, no thrust force acts on the thread engaging mechanism. Therefore, operation of the delicate automatic shoe clearance adjustment device which requires micro-adjustment may be stabilized.

Second Embodiment

A second embodiment of this invention is explained with reference to FIGS. 7–9, where the same reference numbers used in the first embodiment will be similarly numbered while the explanation of those components will be omitted.

The first embodiment explains the case where the first anchors 30, 30 incorporating the shoe clearance adjustment devices are positioned adjacent to but closer to the brake center than the wheel cylinder 20. In a second embodiment, first anchors 130, 130 are positioned adjacent to but farther away from the brake center than the wheel cylinder 20 as shown in FIG. 7, and a second anchor 112 is incorporated with the automatic shoe clearance adjustment devices.

A shoe expander operable upon activating the parking brake is positioned closer to the brake center than the wheel cylinder 20. Detailed descriptions of the same are explained herein.

An anchor body 122 integrally formed with the cylinder body 21 is positioned adjacent to but farther away from the brake center than the wheel cylinder 20. The anchor body 122 has a horizontal through bore 122a formed therein, into which heads 137, 137 are fit respectively, thereby constituting the first anchors 130, 130. The upper adjacent ends 40a, 50a of the brake shoes 40, 50 abut against and engage with the heads 137, 137 respectively.

Each abutment section between the heads 137, 137 and the upper ends 40a, 50a is in convex-concave-like engagement whereby designing the radius of curvature relative to the heads 137, 137 a bit larger than that of the associated one. If the convex-concave-like engagement between the heads 137, 137 and the upper ends 40a, 50a is reversed, the radius of curvature relative to the upper ends 40a, 50a should be designed a bit larger.

Instead of fixing the heads 137, 137 on the anchor body 122, the upper ends 40a, 50a may be abutted against and engaged with the anchor body 122 directly.

A second anchor 112 having the shoe clearance adjustment devices is explained with reference to FIGS. 7 and 8. The second anchor 112 comprises an anchor body 113 fixed on the back plate 10, a pair of adjustment bolts 131, 131 screwed into the anchor body 113, and sleeves 136, 136 relatively rotatably interconnected to the adjustment bolts 131, 131. Further, adjustment levers 133, 133, pins 135, 135, and an adjustment spring 134 are added to constitute an automatic shoe clearance adjustment device having reverse threaded right and left adjustment bolts 131, 131.

The structure of both automatic shoe clearance adjustment devices is the same at the right side and left side except that the anchor body 113 and the adjustment bolt 131 are reverse threaded despite having the same function because of being symmetrical; therefore the following is an explanation of the right side of the device, omitting the left side's explanation.

The adjustment bolt 131 formed integrally with a toothed ring 132 at its intermediate portion has an external thread shaft 131c, its one side screwed and fit in an internal thread 113a of the anchor body 113 and the other side of the shaft 131c relatively rotatably fit in a blind hole of the sleeve 136. The lower end 40b of the brake shoe 40 and the intermediate portion of the adjustment lever 133 abut against and engage with a notched groove 136a of the sleeve 136. The adjustment lever 133 is a substantially L-shaped member, a first arm 133a is pivotally supported on the shoe web 42 by a pin 135 and the urging force of the adjustment spring 134 extended between the adjustment levers 133 and 133 constantly transmits the clockwise turning force with the pin 135 acting as the fulcrum to the adjustment lever 133 and a bias force to make the ratchet engagement with the toothed ring 132.

A structure of a forward pull type parking brake, in which the brake lever moves in the direction parallel with a forward moving vehicle, is explained with reference to FIGS. 7 and 9. A brake lever 90 is superposed on the shoe web 52, where the end 90a is pivotally supported by the pin 91 while the free end 90c has a U-shaped groove bent in such a manner for hooking a parking brake cable which is not shown in the figures.

Figure 7:
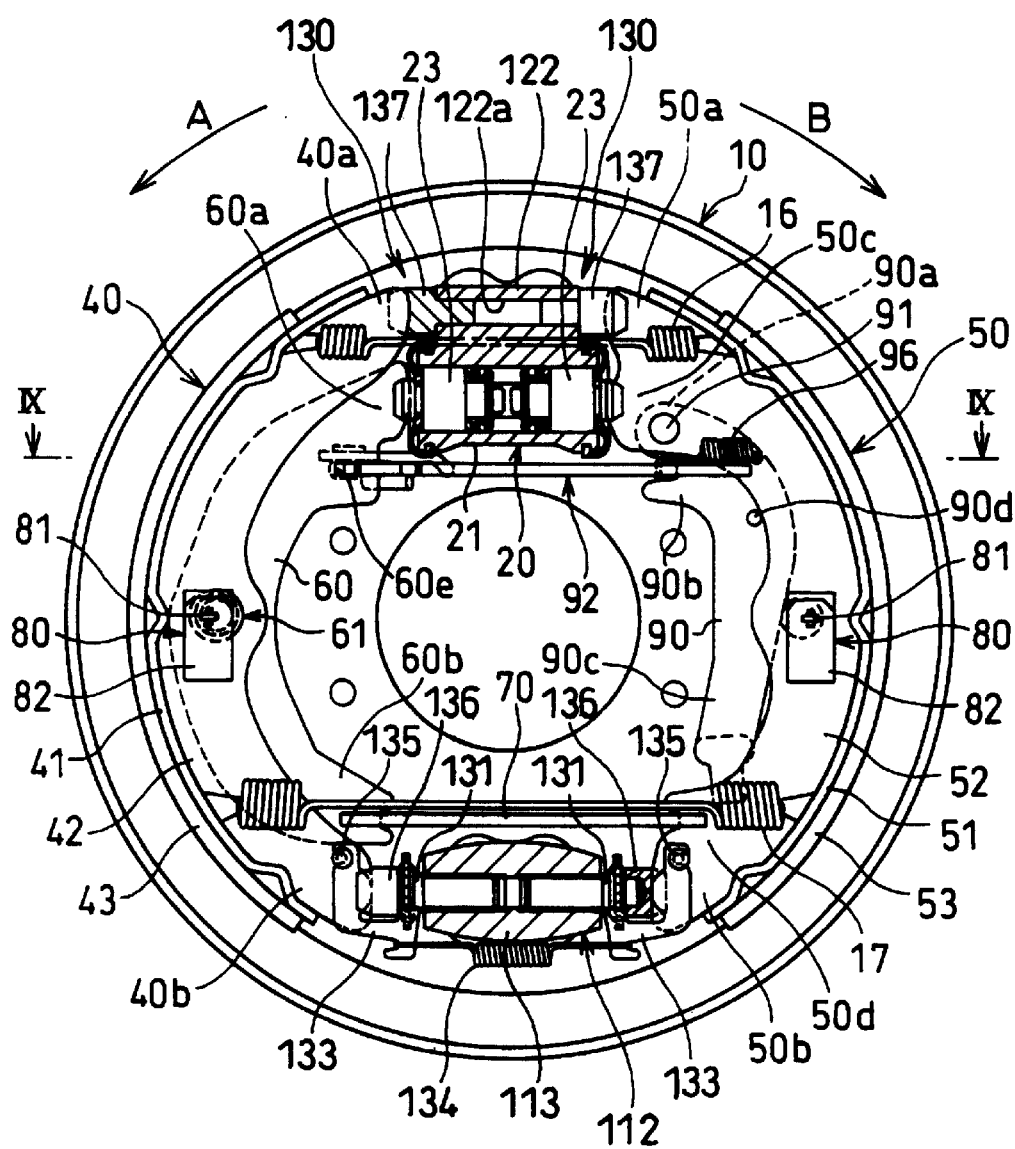
FIG. 7 is a plan view of the drum brake device relating to the second embodiment of this invention.
Figure 8:
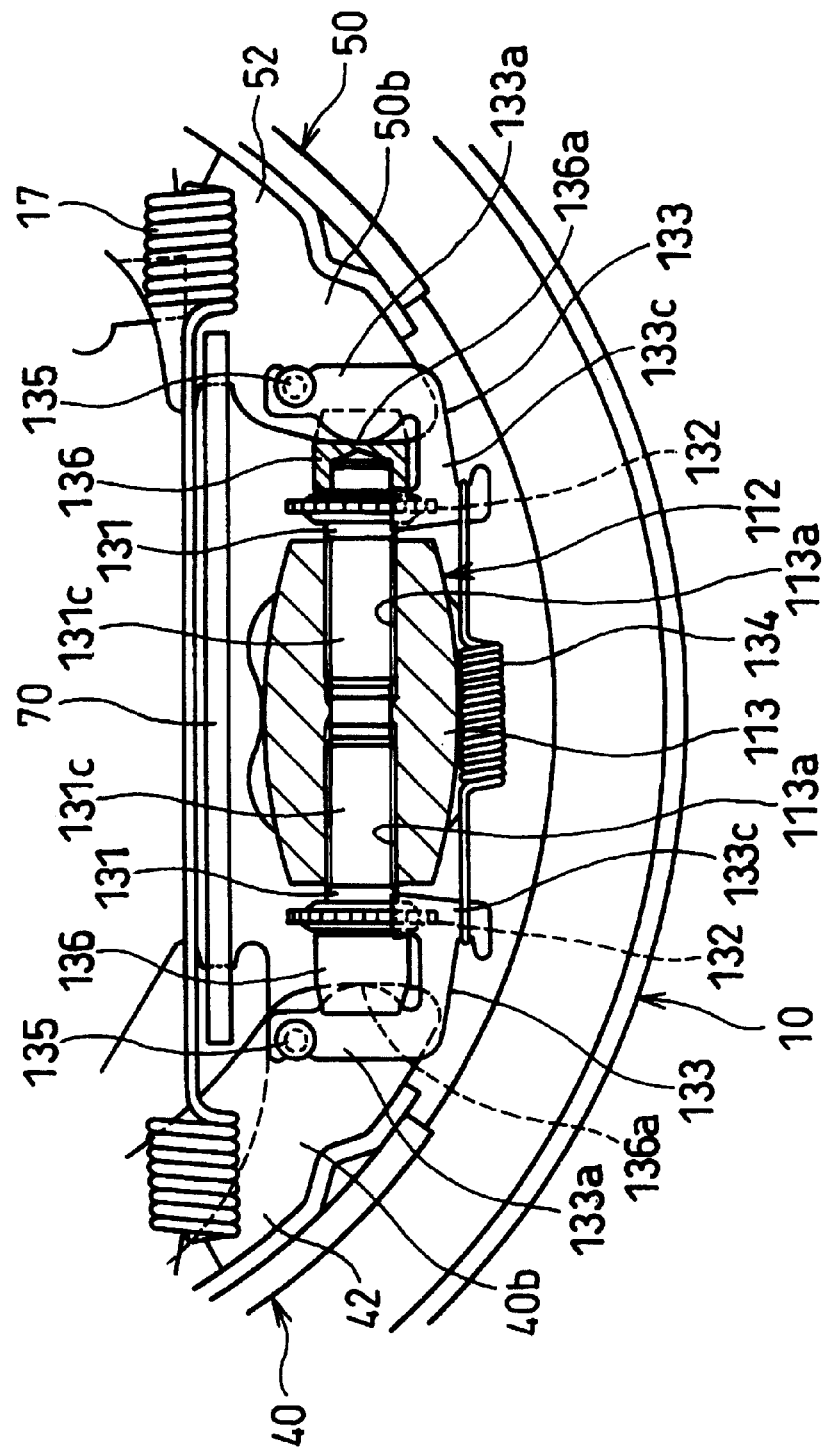
FIG. 8 is an enlarged plan view of the second anchor having the shoe clearance adjustment mechanism.

The brake lever 90 has a protrusion 90d on its intermediate portion, which abuts against the inner edge of the shoe web 52, and the counterclockwise movement of the brake lever 90 with the pin 91 acting as the fulcrum is restricted in FIG. 7.

A strut 92 as a component of this parking brake mechanism comprises a one shot type automatic stroke adjustment mechanism for adjusting the brake lever 90 stroke automatically, which is positioned adjacent to the wheel cylinder 20 and disposed between the pivot lever 60 and an intermediate portion 90b of the brake lever 90.

The strut 92 comprises an adjustment plate 93, a bell crank lever 94, a pin 95, an antirattle spring 96, and a lever spring 97.

A notched groove 93a formed at the right side of the adjustment plate 93 crosses and abuts against the intermediate portion 90b of the brake lever 90. The adjustment plate 93 has its intermediate part with small teeth 93b formed thereon and a slotted hole at its left side in which an intermediate portion of the bell crank lever 94 is pivotally supported and is longitudinally movable along the plate surface with the pin 95 as the fulcrum. Small teeth 94b are formed on a peripheral surface of a fan-shaped arm at one side of the bell crank lever 94, and the teeth 94b engage with small teeth 93b of the adjustment plate 93 while a cam arm 94a freely fits with a rectangular hole 60e formed on the pivot lever 60.

The antirattle spring 96 is extended between the shoe web 52 and the adjustment plate 93 and maintains the abutment between the bottom of the notched groove 93a and the brake lever 90. The lever spring 97 is extended between the adjustment plate 93 and the pin 95, maintaining the engagement of the two by their small teeth 93b and 94b.

A mounting load of these springs is designed so that the antirattle spring 96 is larger than that of other's mounting load.

Braking while in the service brake of this embodiment is the same as the first embodiment and the explanation of which is omitted here.

However, the spring force of the first and the second shoe return springs 16, 17 extended between the pair of brake shoes 40, 50 is configured such that a moment around the pivot point 61 of the brake shoe 40 acting as the fulcrum due to the first and the second shoe return springs 16, 17 acting on the brake shoe 40 is adjusted to set the upper side 40a larger than the lower side 40b as opposed to the first embodiment.

Right and left automatic shoe clearance adjustment devices are symmetrical; therefore, the explanation is made only as to the right device, and the explanation as to the left device is omitted hereunder.

When the service brake is in effect, as already described in the first embodiment, the application force from the wheel cylinder 20 is transmitted to the brake shoe 50 as an outward force of the brake shoe 50, and the lower ends 50b of the brake shoe 50 spreads open, at this time, the pin 135 moves together with the brake shoe 50. The right adjustment lever 133 follows the pin 135 movement with the point of abutment with the sleeve 136 by the urging force of the adjustment spring 134. Accordingly, the second arm 133c of the adjustment lever 133 rotates clockwise.

When the lining 53 on the brake shoe 50 is worn off, the total displacement of the amount of rotation of the second arm 133b on the adjustment lever 133 increases. If the amount of that rotation exceeds one tooth pitch of the toothed ring 132, the bolt 131 is rotated in the direction to be protruded from the anchor body 113, thereby automatically adjusting to keep the constant clearance between the lining 53 and the brake drum, not shown in the figures.

For example, a hand brake lever in the vehicle compartment is operated to pull the parking brake cable, not shown in the figures, the brake lever 90 in FIG. 7 moves clockwise with the pivot point with the pin 91 at the end 90a, which pushes the rectangular hole 60e on the pivot lever 60 toward the left via the strut 92, thereby generating a counter force pushing the intermediate portion 50c of the brake shoe 50 toward the right via the pin 91. Braking after this process is almost identical to the operation when the service brake as in the first embodiment, and the explanation of which is omitted here. Therefore, both brake shoes 40, 50 have a self-servo effect when the brake drum, not shown in the figures, rotates in any direction, thereby functioning as leading shoes with the self-servo effect being derived from the DSL type drum brake device, which offers a stable braking effect.

When the linings 43, 53 are worn off, if the service brake is in effect, the amount of displacement of the upper end 60a on the pivot lever 60 and the intermediate portion 50c of the brake shoe 50 increases. If the amount of displacement exceeds the gap between a right end surface of the cam arm 94a and a right end surface of the rectangular hole 60e on the pivot lever 60, the cam arm 94a is pushed outward by the rectangular hole 60e and the adjustment plate 93 follows the outward movement of the brake shoe 50 together with the brake lever 90.

Figure 9:
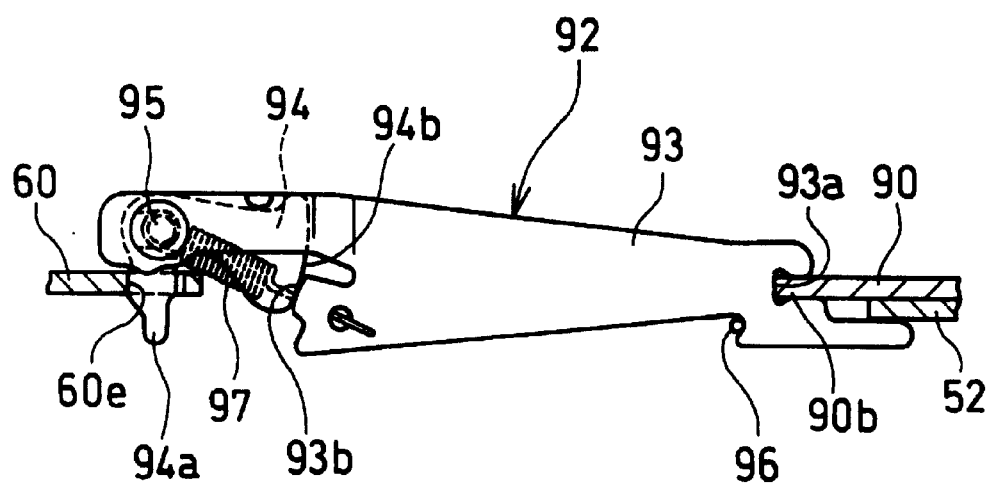
FIG. 9 is a cross-section view IX—IX of FIG. 7.
Figure 10:
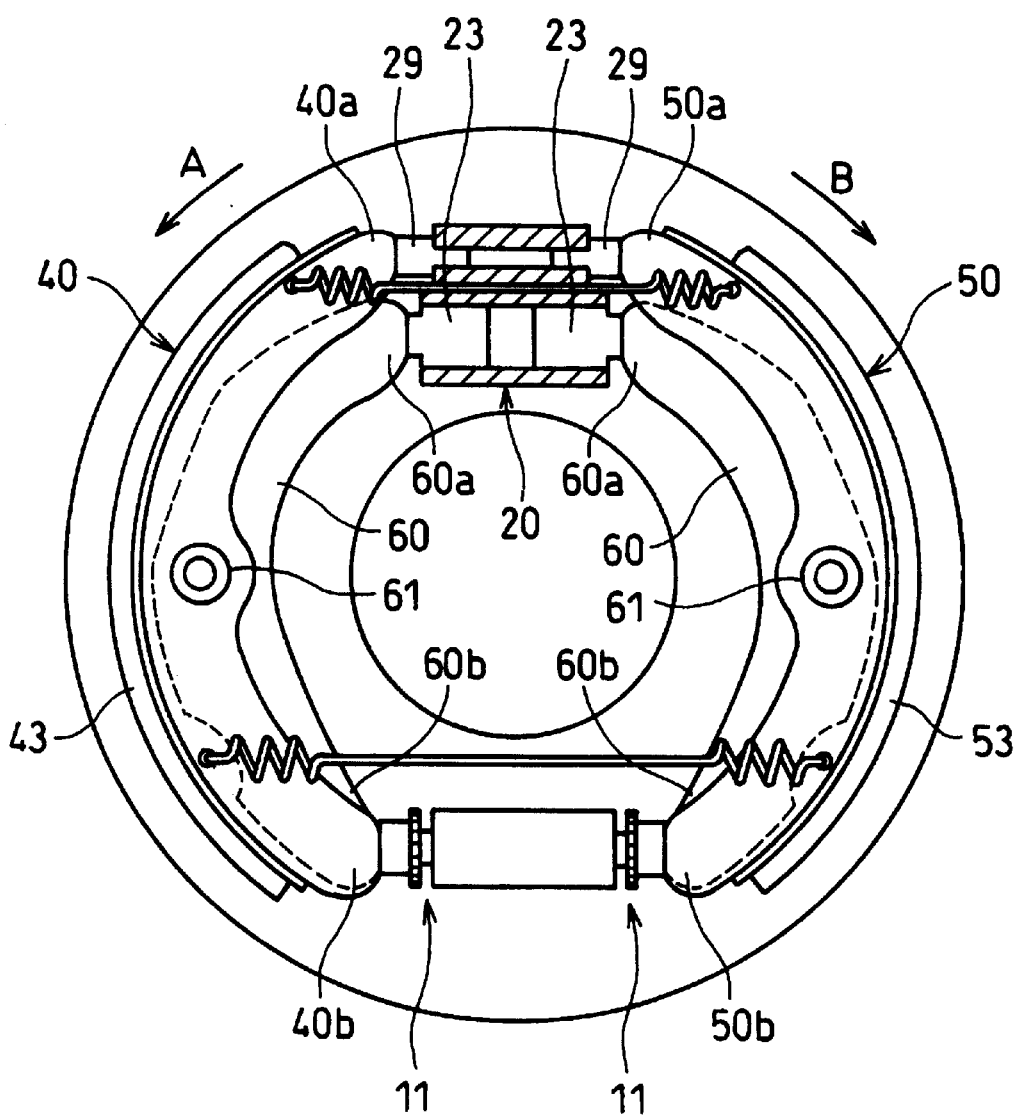
FIG. 10 is a model view of the conventional drum brake device.

At that time, if the small teeth 94b of the bell crank lever 94 come out of the engagement from the small teeth 93b of the adjustment plate 93, the bell crank lever 94 rotates clockwise in FIG. 9 with the pin 91 as the fulcrum, and the next tooth comes into engagement with the small teeth 93b. A position change of the cam arm 94a relative to the rectangular hole 60e compensates for the increase of the brake lever 90 stroke due to the wearing of the linings 43, 53, thereby automatically adjusting the constant stroke of the brake lever 90.

This invention is not limited to what is described in the first and the second embodiments. For example, arrangement of the wheel cylinder 20 and the first anchors 30, 30, 130, 130 in the first and the second embodiments or the structure of the second anchors 12, 112 may be interchanged. Further, it is evident that a parking brake mechanism may be applied in the first embodiment, and a cross-pull type of parking brake mechanism may be easily employed instead of the forward-pull type one.

This invention has the following advantages.

When the brake shoes frictionally engage and interact with the brake drum during braking, the pivot lever is supported by the strut free to swing in order to smoothly move together with the brake shoes, thereby providing a D2L type drum brake device with high braking efficiency despite of a single shoe-actuator.

The pivot lever smoothly moves until it contacts with one of the brake shoes supported by the anchor, which eliminates overload on the pivot and abutment sections thereof and provides a highly durable device.

When incorporating the automatic shoe clearance adjustment mechanism, no overload is encountered when adjusting. Therefore, operation of the delicate automatic shoe clearance adjustment device, which requires microadjustment, may be stabilized.

This invention enables the downsizing of the pivot lever and strut for realizing the drum brake with one shoe-actuator for the service brake, which reduces the cost of manufacturing and the overall weight of the device.

The parking brake mechanism of this invention can easily be installed.

It is readily apparent that the above-described invention has the advantages of wide commercial utility. It may be understood that the specific form of the invention hereinabove described is intended to be representative only, and certain modifications within the scope of these teachings will be apparent to those skilled in the art without departing from the spirit and scope of the invention.

Accordingly, reference should be made to the following claims in determining the full scope of the invention.

What we claim is:

1. A drum brake device comprising:
    a pair of brake shoes positioned to face each other and to be frictionally engageable with an inner circumferential surface of a brake drum,
    a first anchor, supporting said pair of brake shoes, disposed between first adjacent ends of said brake shoes,
    a second anchor disposed between second adjacent ends of said brake shoes opposite said first adjacent ends,
    a pivot lever with an intermediate portion pivotally supported on a first one of said brake shoes,
    a shoe-actuator positioned adjacent to said first anchor and being disposed between one end of said pivot lever and a second one of said brake shoes, and
    a strut positioned adjacent to said second anchor and being disposed between and being functionally engaged with a second end of said pivot lever and the second one of said brake shoes,
    wherein an application force of said shoe-actuator is transmitted to said first one of said brake shoes via a pivot section of said pivot lever and transmitted to the second one of said brake shoes directly from said shoe-actuator and indirectly via said strut.

2. The drum brake device as claimed in claim 1, further comprising:
    a pair of shoe clearance adjustment devices having a telescopically screw-mechanism incorporated in one of said first and second anchors that are both supporting said pair of brake shoes.

3. The drum brake device as claimed in claim 2, further comprising:

an automatic shoe clearance adjustment device which senses an amount of movement of said brake shoes and automatically extends an entire length of said screw-mechanism.

4. The drum brake device as claimed in claim 1, wherein said shoe-actuator operates by service brake operation.

5. The drum brake device as claimed in claim 1, wherein said shoe-actuator is a shoe expander operating by parking brake actuation.

6. The drum brake device as claimed in claim 5, wherein a stroke adjustment mechanism is included for an adjustment of said shoe expander stroke operating by the parking brake.

7. The drum brake device as claimed in claim 6, wherein said stroke adjustment mechanism senses the amount of movement of the brake shoes and automatically keeps a constant stroke of said shoe expander.

* * * * *